//<br>
3,495,255<br>
Patented Feb. 10, 1970

3,495,255
THERMOPLASTIC COPOLYMERS OF BENZ-IMIDAZOLONE AND DIEPOXIDES

Paul J. George, West Richfield, Ohio, assignor to The B. F. Goodrich Company, New York, N.Y., a corporation of New York
No Drawing. Filed June 22, 1967, Ser. No. 647,965
Int. Cl. C08g 30/14
U.S. Cl. 260—2        10 Claims

ABSTRACT OF THE DISCLOSURE

Benzimidazolone and aromatic or cycloaliphatic diepoxides are reacted to form linear thermoplastic polymers having good stability. The diepoxides especially useful are those of the glycidyl ether type and those derived from epoxidized olefins. The polymers of this invention are useful as protective coatings and can be drawn into fibers.

BACKGROUND OF THE INVENTION

This invention relates to novel polymers and more particularly relates to thermoplastic copolymers formed by the reaction of benzimidazolone with a diepoxide, particularly where the diepoxy compounds have aromatic or cycloaliphatic structures.

The reactivity of the epoxy group and the functionality of compounds containing a plurality of epoxide groupings has been widely employed to produce a variety of useful materials. For example, it is recognized that amines, both aliphatic and aromatic, are useful curing agents for epoxy resins, however, highly cross-linked polymer networks are obtained when amine curing agents are used, and the resulting cured resins are of the thermoset type. Amides, however, do not serve as useful curing agents for epoxy resins. Amide curing agents have been found to be useful for epoxy resins only when free amines or amine decomposition products of the amide are present.

SUMMARY OF THE INVENTION

I have now found that by reacting benzimidazolones with diepoxides, and preferably aromatic epoxides of the glycidyl ether type or cycloaliphatic diepoxides, that novel linear thermoplastic polymers are produced. The formation of the linear thermoplastic polymers of this invention is possible due to the unique structure of the benzimidazolones which enables the achievement of a more controllable reaction and thus prevents the formation of a highly cross-linked system. In addition to having a linear structure, the polymers of this invention possess a high degree of stability due to the aromatic or cycloaliphatic nature of the polymer backbone.

In short, the polymers of this invention are formed by the reaction of a benzimidazolone and a diepoxide, wherein the benzimidazolone and diepoxide units are arranged in an alternate fashion throughout the polymer chain. The diepoxides employed will preferably be derived from aromatic or cycloaliphatic structures. The resulting linear thermoplastic polymers are heat resistant and possess a high degree of stability. The polymers have high melting points and are capable of being drawn into filaments, cast into films as well as being useful for a variety of other common applications such as coatings and the like.

DETAILED DESCRIPTION OF THE INVENTION

The benzimidazolones (sometimes called benzimidazolones) which may be reacted to form the linear polymers of the present invention correspond to the structural formula

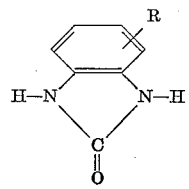

wherein R represents a hydrogen or an alkyl group containing from 1 to 18 carbon atoms, and preferably containing from 1 to 8 carbon atoms. It is to be understood that the aromatic ring of the benzimidazolone may contain two or even more alkyl constituents as described above and still fall within the scope of the present invention. Other groups which will not interfere with the reactivity of the benzimidazolone or interfere with the reaction in any other way may also be substituted on the aromatic ring if so desired. Such groups might also include aryl groups, alkoxy groups, nitro groups, halogens or the like.

Diepoxides to be reacted with the benzimidazolone will have aromatic or cycloaliphatic structures. In general, the diepoxides will be either glycidyl ether resins of the Bisphenol A-epichlorohydrin type, having the structural formula

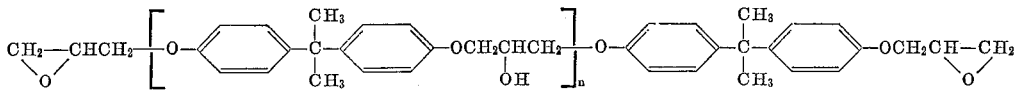

wherein $n$ can be 0, in the simplest case, or a positive integer ranging up to about 20, or epoxidized olefins such as vinylcyclohexene dioxide, bis(2,3-epoxycyclopentyl) ether, the cycloaliphatic epoxy resin-carboxylate types, or the like. Excellent results have been obtained when the epoxy compound employed was of the Bisphenol A-epichlorohydrin type in the molecular weight range up to about 5000. The polymer obtained when a benzimidazolone is reacted with a Bisphenol A-epichlorohydrin resin has recurring structural units of the formula

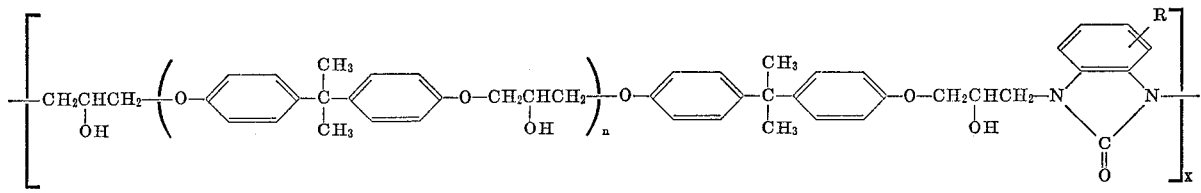

wherein R is a hydrogen or an alkyl radical containing from 1 to 18 carbon atoms, $n$ may be 0 or a positive integer up to about 20 and $x$ is a positive integer.

It is evident from the above description that a wide variety of polymers may be prepared in accordance with the present invention and consequently polymer properties will vary accordingly. This permits the formulation of polymers to meet specific demands which may arise. It should also be noted that with the benzimidazolone/ Bisphenol A-epichlorohydrin resin polymers especially, that the polymer properties can be modified not only by varying the ultimate molecular weight of the polymer but also by varying the value of $n$, i.e. by varying the particular Bisphenol A-epichlorohydrin resin to be employed.

In conducting the reaction to form the linear thermoplastic polymers of this invention it is not absolutely essential that the benzimidazolone and the diepoxide be employed in equivalent proportions; however, to form high molecular weight polymerizates it is best that the molar ratio of the reactants be about 1:1. A 10 to 20% excess of either reactant may be employed if desired; however, by maintaining a 1:1 mol ratio of reactants the polymers obtained have higher molecular weights and generally better physical properties than polymers obtained when an excess of one of the reactants is used. On this basis, it is therefore preferable that the reactants be as pure as possible, that is, that they do not contain unnecessary amounts of impurities or other materials that would interfere with the reaction. Likewise, the epoxide compound used should contain two epoxide groups per molecule or as close thereto as possible to avoid undue cross-linking. Contaminants capable of reacting with either of the reactants should be avoided in order to obtain high molecular weight polymers. Catalysts may be employed to enhance the reaction of the epoxy compounds with the benzimidazolone, however, excellent results have been obtained in their absence. The reaction may be conducted within a broad temperature range; however, it is generally preferred that the reaction temperature range from about 20° C. to about 350° C. Excellent results have been obtained at temperatures between about 100° C. and 250° C. The reaction temperature will depend to a large extent on the materials to be reacted, that is, the particular benzimidazolone or diepoxide employed. The reaction is generally carried out at atmospheric pressure; however, if desired, it may be conducted at pressures greater than atmospheric or at sub-atmospheric pressures. It is often desirable to employ inert atmospheres of nitrogen, argon, helium or the like when carrying out the reaction.

It is not necessary to conduct the reaction in the presence of a solvent or an inert diluent since many of the diepoxides are themselves liquid and serve as a convenient reaction medium. Even if both reactants are solids, a solvent or diluent is still not required since excellent results have been obtained by bulk polymerizations. This is not to say that inert diluents or solvents cannot be employed, they are often desirable where the diluent employed is also a solvent for the reactants and the resulting polymer. Such solvents might include: the aromatic hydrocarbons and halogenated aromatic hydrocarbons; tertiary amines; N,N-disubstituted amides such as dimethyl formamide and dimethyl acetamide; sulfones; lactones such as γ-butyrolactone; ethers such as diphenyl ether and tetrahydrofuran; nitriles; esters; or the like. The reactions conducted with the inert diluents capable of dissolving the resulting polymer are often desirable since a polymer solution may be obtained directly and such polymer solution may be subsequently used to cast films or the like. The linear copolymers of the present invention may also be prepared by either batch or continuous methods. Such methods have been adequately described in the literature.

The polymers of this invention are generally white, sometimes ranging to a yellow or yellow-brown depending on the purity of the reactants and the reaction conditions employed. The polymers are generally soluble in solvents such as metacresol, dimethyl sulfoxide, dimethyl formamide, hexamethylphosphoric triamide and the like. Typically the polymer melt temperatures of the linear polymers will range from about 100° C. to about 350° C. and higher. The polymers are useful for a variety of applications including drawn filaments, films, castings, foils, adhesive applications and the like. They can be used as such or can be compounded with additives such as fillers, pigments, dyes, lubricants, or other resins. If desirable, the polymers may be cured to a limited extent with conventional epoxy resin curing agents such as the diamines and polyamines.

The following examples serve to illustrate the invention more fully; however, they are not intended to limit the scope thereof. All parts and percentages are given on a weight basis.

Example I

A polymer was prepared by reacting benzimidazolone with an epoxidized olefin. Benzimidazolone (0.71 part) was mixed with 1.27 parts of a resin of the cycloaliphatic epoxy carboxylate type having the structural formula

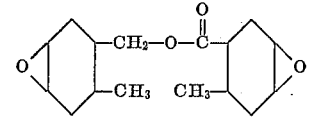

and a trace of 2,6-dimethylpyridine as catalyst. The flask and its contents were heated between 200 and 250° C. for about 20 minutes with stirring. Nitrogen was passed through the system during the heating. Extremely long fibers were pulled from the polymer. The fibers were glossy and had a tendency to be brittle.

Example II

To demonstrate the preparation of a benzimidazolone/ Bisphenol A-epichlorohydrin resin polymer, about 1.11 parts benzimidazolone and 1.58 parts of a Bisphenol A-epichlorohydrin resin having an epoxide equivalent from 175 to 210 were mixed in a flask by heating in a flame. The flask was then sealed and maintained at a temperature of 150° C. for 16 hours. The resulting polymer had a polymer melt temperature greater than 100° C. and fibers were pulled at 175° C.

A portion of the polymer was dissolved in dimethyl formamide. The 25% solution was brushed onto an iron sheet and the solvent evaporated. The dried polymer film formed a tough, thermal resistant protective coating on the metal sheet.

Examples III-IV

Example II was repeated except that small amounts of 2,6-dimethyl pyridine was present in the reaction mixture. Polymers obtained were identical to that of Example II.

Example V

To demonstrate the versatility of the present invention, benzimidazolone was reacted with an epoxy resin having a higher molecular weight. Benzimidazolone (0.20 part) and 2.77 parts of a Bisphenol A-epichlorohydrin resin having an epoxide equivalent of approximately 925 were heated in a flask under a nitrogen atmosphere. Heating was continued with stirring until a temperature of 300° C. was reached. Heating was continued at 300° C. for 5 minutes the reaction mixture allowed to cool to 125° C. and the heating cycle repeated again. Fibers having considerable strength were readily drawn from the polymer melt. The polymer melt temperature was 120° C.

The examples set forth above demonstrate that useful thermoplastic polymers, capable of being drawn into fibers and of being used as films, can be prepared by reacting benzimidazolone with a diepoxy compound, wherein the diepoxide is one having an aromatic or cycloaliphatic structure.

I claim:
1. A linear thermoplastic polymer comprising the reaction product of a benzimidazolone having the structural formula

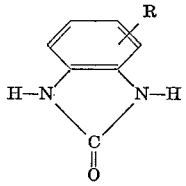

wherein R represents hydrogen or an alkyl group containing from 1 to 18 carbon atoms, with an aromatic or cycloaliphatic vicinal diepoxide.
2. A polymer of claim 1, wherein benzimidazolone is employed as a reactant.
3. A polymer of claim 2, wherein the aromatic diepoxide is a Bisphenol A-epichlorohydrin of the formula

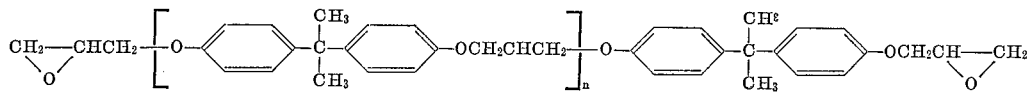

wherein $n$ can be 0 or a positive integer up to about 20.
4. A polymer of claim 2, wherein the cycloaliphatic diepoxide is derived from an epoxidized olefin.
5. A polymer of claim 4, wherein cycloaliphatic diepoxide is of the cycloaliphatic epoxy resin—carboxylate type.
6. A polymer of claim 5, wherein the cycloaliphatic diepoxide has the structural formula

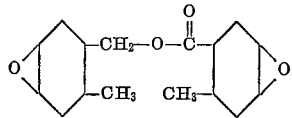

7. A process for preparing a linear thermoplastic polymer which comprises reacting a benzimidazolone having the structural formula

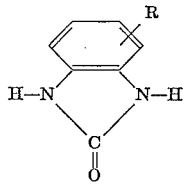

wherein R is hydrogen or an alkyl radical containing from 1 to 18 carbon atoms with an aromatic or cycloaliphatic vicinal diepoxide, in about a 1:1 mol ratio and at a temperature of about 20° C. to about 350° C.
8. A process of claim 7, wherein the temperature is between about 100° C. and about 250° C.
9. A process of claim 7, wherein the reaction is carried out in an inert organic diluent.
10. A process of claim 7, wherein a catalyst is employed.

References Cited
UNITED STATES PATENTS 2,980,652   4/1961   Melamed et al. _____ 260—77.5

WILLIAM H. SHORT, Primary Examiner

E. NIELSEN, Assistant Examiner

U.S. Cl. X.R.

260—30.6, 30.8, 32.6, 33.4, 47